(12) United States Patent
Ho

(10) Patent No.: US 8,777,243 B1
(45) Date of Patent: Jul. 15, 2014

(54) GOLF CART FRONT WHEEL DIRECTION ADJUSTMENT DEVICE

(71) Applicant: Dongguan Xinfeng Plastics & Electrical Appliances Co., Dongguan (CN)

(72) Inventor: Siu Fung Ho, Dongguan (CN)

(73) Assignee: Dongguan Sunforce Plastics & Electrical Appliances Co., Ltd., Dongguan, Guangdong Province (CN)

( * ) Notice: Subject to any disclaimer, the term of this patent is extended or adjusted under 35 U.S.C. 154(b) by 0 days.

(21) Appl. No.: 14/099,697

(22) Filed: Dec. 6, 2013

(30) Foreign Application Priority Data

Apr. 17, 2013 (CN) .......................... 2013 2 0193875

(51) Int. Cl.
*B60G 1/00* (2006.01)
*A63B 55/08* (2006.01)

(52) U.S. Cl.
CPC .. *B60G 1/00* (2013.01); *A63B 55/08* (2013.01)
USPC .................... 280/124.117; 280/641; 280/651; 180/19.1

(58) Field of Classification Search
CPC ....................................................... A63B 55/08
USPC .................. 280/124.117, 641, 651; 180/19.1
See application file for complete search history.

(56) References Cited

U.S. PATENT DOCUMENTS

| 3,247,923 | A | * | 4/1966 | Cornell | 180/19.1 |
| 4,527,652 | A | * | 7/1985 | Savard, Jr. | 180/19.3 |
| 5,375,673 | A | * | 12/1994 | McCall et al. | 180/13 |
| 2013/0093165 | A1 | * | 4/2013 | Liao | 280/651 |
| 2014/0001734 | A1 | * | 1/2014 | Wang | 280/641 |

FOREIGN PATENT DOCUMENTS

WO WO 2012071785 A1 * 6/2012

* cited by examiner

*Primary Examiner* — Paul N Dickson
*Assistant Examiner* — Darlene P Condra
(74) *Attorney, Agent, or Firm* — Tza Lung Yeung

(57) ABSTRACT

A front wheel direction adjustment device for a golf cart having a front wheel includes an axle, an adjustment shaft assembly, and a rotating shaft assembly. The axle is mounted on the front wheel. The adjustment shaft assembly is coupled to the first portion of the axle. The rotating shaft assembly is coupled to the second portion of the axle, wherein the adjustment shaft assembly comprises a first supporting tube, a first sleeve, a first adjustment member, and a locking bolt, wherein the first supporting tube has two elongated locking slots spacedly and longitudinally forming at two sides of a lower end of the supporting tube respectively, wherein the first supporting tube is partially and securely received in the first sleeve, wherein the rotating shaft assembly comprises a second supporting tube, a second sleeve, and a blocking member.

5 Claims, 4 Drawing Sheets

GOLF CART FRONT WHEEL DIRECTION ADJUSTMENT DEVICE

BACKGROUND OF THE PRESENT INVENTION

1. Field of Invention

The present invention relates to a golf cart, and more particularly to a front wheel direction adjustment device for a golf cart.

2. Description of Related Arts

A majority of conventional golf carts does not usually have any adjustment devices for adjusting the direction of the golf cart when it is moving. For those which are equipped with direction adjustment arrangements, the corresponding structures of which are usually very complicated and technically unreasonable. Moreover, conventional direction adjustment arrangements are very difficult or inconvenient to operate. All these factors lead to high manufacturing costs and complicated manufacturing procedures.

SUMMARY OF THE PRESENT INVENTION

An objective of the present invention is to provide a front wheel direction adjustment device for a golf cart for allowing a user to conveniently control a moving direction thereof.

In one aspect of the present invention, it provides a front wheel direction adjustment device for a golf cart having a front wheel, comprising:

an axle mounted on the front wheel, wherein the axle has a first portion and a second portion transversely extending from two sides of the front wheel respectively;

an adjustment shaft assembly coupled to the first portion of the axle; and a rotating shaft assembly coupled to the second portion of the axle, wherein the adjustment shaft assembly comprises a first supporting tube, a first sleeve, a first adjustment member, and a locking bolt, wherein the first supporting tube has two elongated locking slots spacedly and longitudinally forming at two sides of a lower end of the supporting tube respectively, wherein the first supporting tube is partially and securely received in the first sleeve, wherein the rotating shaft assembly comprises a second supporting tube, a second sleeve, and a blocking member.

DETAILED DESCRIPTION OF THE PREFERRED EMBODIMENT

Figure 1:
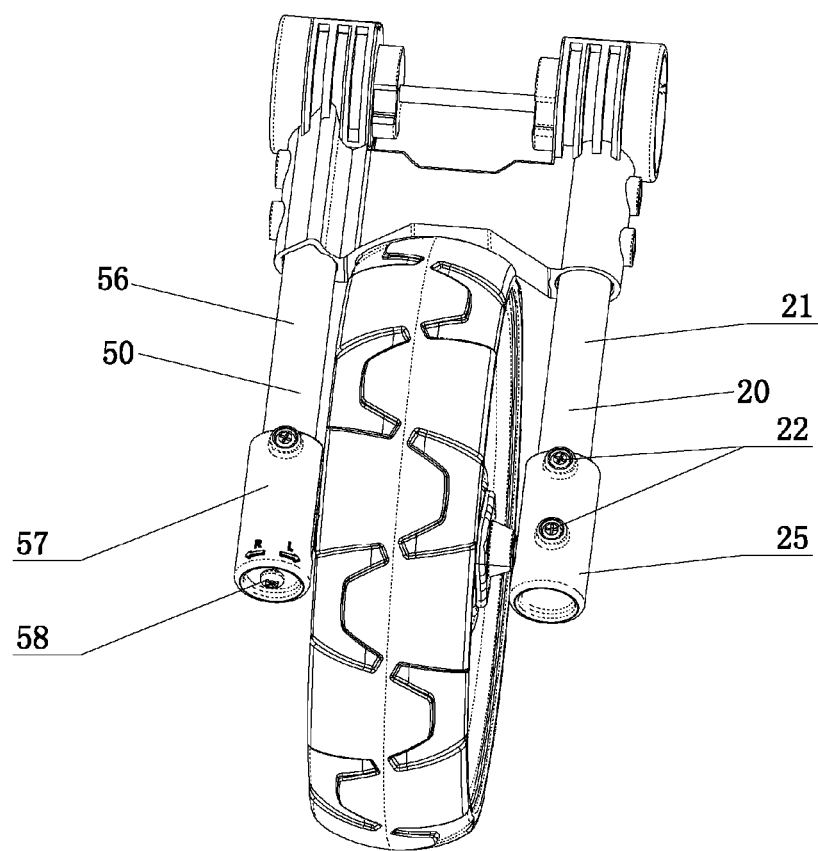
FIG. 1 is front perspective view of a front wheel direction adjustment device for a golf cart according to a preferred embodiment of the present invention.
Figure 2:
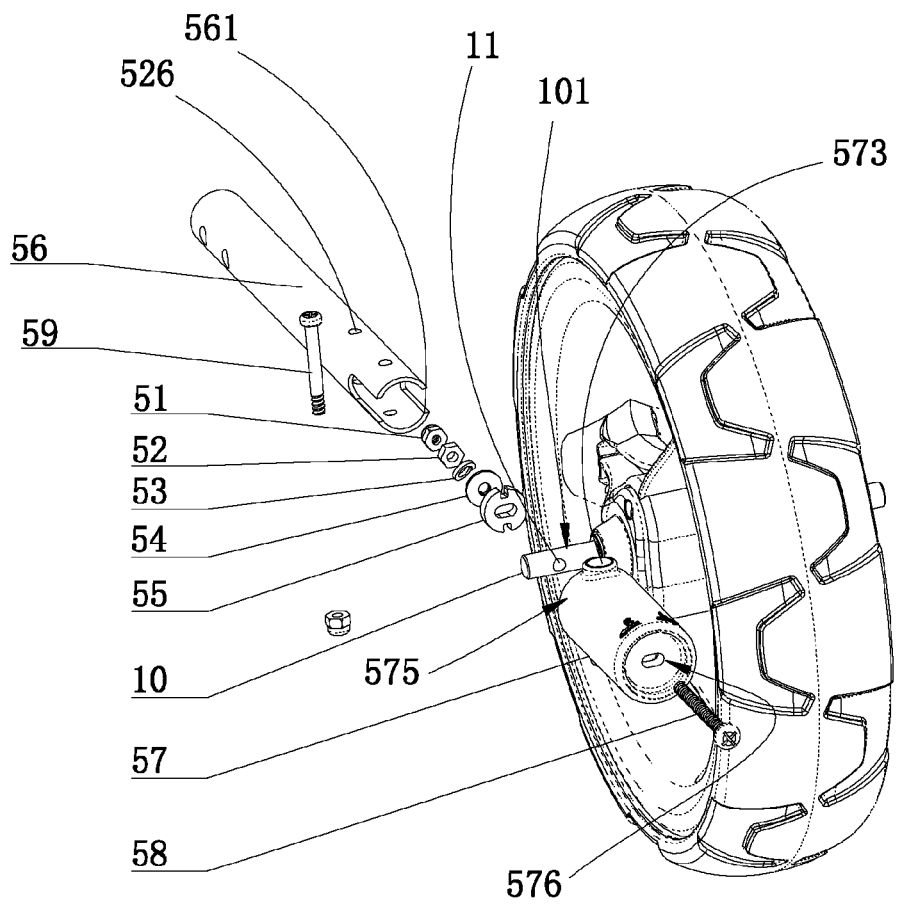
FIG. 2 is a first exploded perspective view of the front wheel direction adjustment device for a golf cart according to the preferred embodiment of the present invention.

The following detailed description of the preferred embodiment is the preferred mode of carrying out the invention. The description is not to be taken in any limiting sense. It is presented for the purpose of illustrating the general principles of the present invention. Each of the inventive features described below can be used independently of one another or in combination with other features.

Referring to FIG. 1 to FIG. 4 of the drawings, a front wheel direction adjustment device according to a preferred embodiment of the present invention is illustrated. The front wheel direction adjustment device is for a golf cart and for facilitating an adjustment of moving direction of the golf cart.

Specifically, the front wheel direction adjustment device comprises an axle 10 mounted on the front wheel of the golf cart. The axle 10 has a first portion 101 and a second portion 102 transversely extending from two sides of the front wheel respectively. The front wheel direction adjustment device further comprises an adjustment shaft assembly 50 coupled to the first portion 101 of the axle 10, and a rotating shaft assembly 20 coupled to the second portion 102 of the axle 10.

The adjustment shaft assembly 50 comprises a first supporting tube 56, a first sleeve 57, a first adjustment member 58, a locking bolt 59, a damper 55, a washer 54, a shell pad 53, a flat nut 52 and a self-locking nut 51. The axle 10 has a through hole 11 transversely forming thereon, wherein a longitudinal axis of the through hole 11 is aligned with the a longitudinal axis of the first supporting tube 56. On the other hand, the first supporting tube 56 has two elongated locking slots 561 spacedly and longitudinally forming at two sides of a lower end of the supporting tube 56 respectively.

The first sleeve 57 has a tubular structure and has a circular cross section. Furthermore, the first sleeve 57 defines an opened end 575, a closed end 576, and a plurality of engaging slots 571 formed at the closed end of the first sleeve 57, wherein a corresponding engaging end portion of the first supporting tube 56 is arranged to securely insert into the engaging slots 571 of the first sleeve 57 so that the relative position of the first supporting tube 56 and the first sleeve 57 can be fixed. In other words, the two locking slots 561 formed on the first supporting tube 56 define two corresponding engaging end portions of the first supporting tube 56 between the two locking slots 561. The first sleeve 57 has an elongated first connecting slot 572 formed on a side surface thereof for allowing the axle 10 to connect to the first sleeve 57 through the first connecting slot 572. In addition, the first adjustment member 58 is arranged to adjustably penetrate through the first sleeve 57 from the closed end 576 thereof.

The first supporting tube 56 further has a first bored hole 526, while the first sleeve 57 further has a second bored hole 573, wherein when the first supporting tube 56 is partially inserted into the first sleeve 5, the first bored hole 526 and the second bored hole 573 overlap, and the locking bolt 59 is arranged to penetrate through the first supporting tube 56 and the first sleeve 57 via the first bored hole 562 and the second bored hole 573.

When the adjustment shaft assembly 50 is properly assembled, the first adjustment member 58 is arranged to penetrate first sleeve 57, the through hole 11 of the axle 10, the damper 55, the washer 54, the shell pad 53, the flat nut 52 and the self-locking nut 51.

Figure 4:
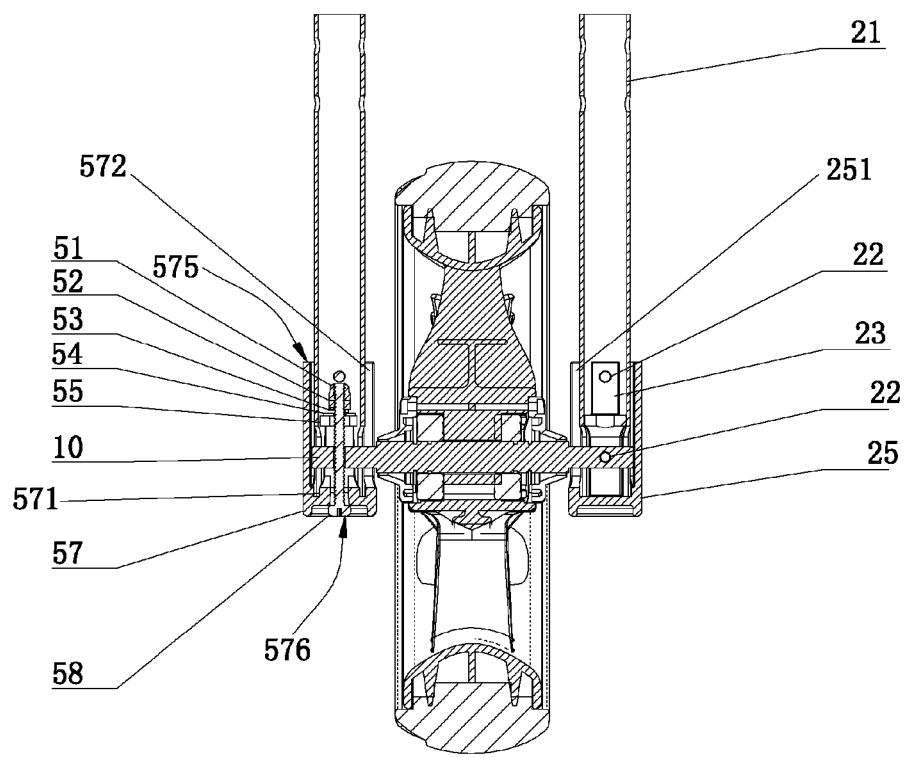
FIG. 4 is a sectional side view of the front wheel direction adjustment device for a golf cart according to the preferred embodiment of the present invention.

As shown in FIG. 4 of the drawings, the first supporting tube 56 is arranged to be inserted into the first sleeve 57 in such a manner that a transverse axis of each of the two locking slots 561 is aligned with a longitudinal axis of the axle 10, so that the axle 10 is arranged to penetrate through the two locking slots 561 when the first supporting tube 56 is inserted into the first sleeve 57. The locking bolt 59 connects the first sleeve 57 to the first supporting tube 56 through penetration of the first bored hole 562 and the second bored hole 573. Since the axle 10 passes through the two locking slots 561 which are elongated in structure, the axle 10 is adapted to move along a longitudinal direction of the first supporting tube 56.

Figure 3:
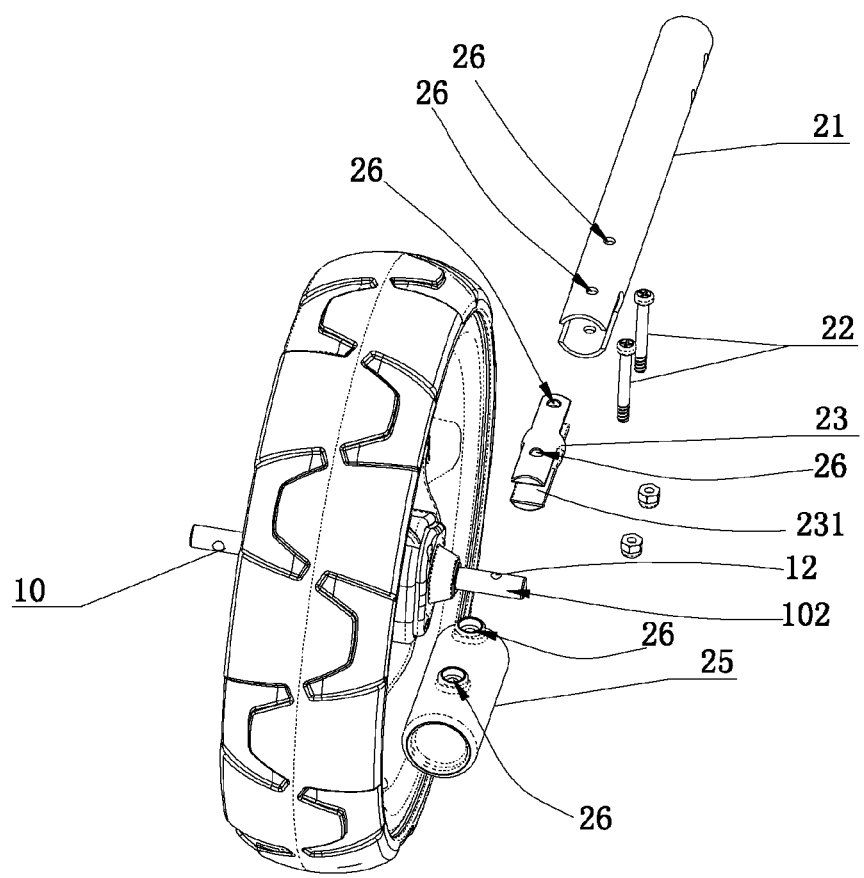
FIG. 3 is a second exploded perspective view of the front wheel direction adjustment device for a golf cart according to the preferred embodiment of the present invention.

On the other hand, the rotating shaft assembly 20 comprises a second supporting tube 21, a second sleeve 25, a plurality of mounting pins 22, and a blocking member 23. As shown in FIG. 3 to FIG. 4 of the drawings, the second supporting tube 21 has a second connecting slot 12 for allowing the axle 10 to pass therethrough. Thus, the axle 10 is arranged to connect to the rotating shaft assembly 20 by penetrating through the second connecting slot 12. In addition, the second sleeve 25 has a mounting slot 251 for allowing the axle 10 to penetrate therethrough.

Each of the second supporting tube 21, the blocking member 23 and the second sleeve 25 has at least one hole 26 formed thereon, wherein the mounting pins 22 are arranged to connect the second supporting tube 21, the blocking member 23 and the second sleeve 25 through the holes 26 forming thereon. The rotating shaft assembly 20 is arranged to allow rotation of the axle 10, while the adjustment shaft assembly 50 determines the extent to which the axle 10 is rotated.

As compared to conventional arts, the present invention, the front wheel direction adjustment device of the present invention, the rotating shaft assembly 20 is capable of rotating about the mounting pins 22 while the first adjustment member 58 of the adjustment shaft assembly 58 is used to determine the extent of rotation. The present invention is easy to use, more flexible, and structurally stable. Thus, the present invention is simple in structure, and minimizes the manufacturing and maintenance cost of the direction adjustment device as a whole.

The present invention, while illustrated and described in terms of a preferred embodiment and several alternatives, is not limited to the particular description contained in this specification. Additional alternative or equivalent components could also be used to practice the present invention.

What is claimed is:

1. A front wheel direction adjustment device for a golf cart having a front wheel, comprising:

an axle mounted on said front wheel, wherein said axle has a first portion and a second portion transversely extending from two sides of said front wheel respectively;

an adjustment shaft assembly coupled to said first portion of said axle; and a rotating shaft assembly coupled to said second portion of said axle, wherein said adjustment shaft assembly comprises a first supporting tube, a first sleeve, a first adjustment member, and a locking bolt, wherein said first supporting tube has two elongated locking slots spacedly and longitudinally forming at two sides of a lower end of said supporting tube respectively, wherein said first supporting tube is partially and securely received in said first sleeve, wherein said rotating shaft assembly comprises a second supporting tube, a second sleeve, and a blocking member.

2. The front wheel direction adjustment device, as recited in claim 1, wherein said adjustment shaft assembly is arranged to rotate with respect to said rotating shaft assembly.

3. The front wheel direction adjustment device, as recited in claim 1, wherein said first sleeve defines an opened end, a closed end, and a plurality of engaging slots formed at said closed end of said first sleeve, wherein a corresponding engaging end portion of said first supporting tube is arranged to securely insert into said engaging slots of said first sleeve so that a relative position of said first supporting tube and said first sleeve is fixed.

4. The front wheel direction adjustment device, as recited in claim 3, wherein said adjustment shaft assembly further comprises a damper, a washer, a shell pad, a flat nut and a self-locking nut, wherein said first adjustment member is arranged to penetrate said damper, said washer, said shell pad, said flat nut and said self-locking nut.

5. The front wheel direction adjustment device, as recited in claim 4, wherein said second sleeve has a mounting slot for allowing said axle to penetrate therethrough.

* * * * *